United States Patent
Wu et al.

(10) Patent No.: US 7,336,331 B2
(45) Date of Patent: Feb. 26, 2008

(54) PIXEL STRUCTURE IN LIQUID CRYSTAL DISPLAY

(75) Inventors: Ivan Wu, Taipei (TW); Dai-Liang Ting, Hsinchu (TW); Wei-Chih Chang, Hsinchu Hsien (TW)

(73) Assignee: Unipac Optoelectronics Corp., Hsinchu (TW)

( * ) Notice: Subject to any disclaimer, the term of this patent is extended or adjusted under 35 U.S.C. 154(b) by 598 days.

(21) Appl. No.: 09/767,390

(22) Filed: Jan. 23, 2001

(65) Prior Publication Data

US 2002/0093618 A1 Jul. 18, 2002

(30) Foreign Application Priority Data

Nov. 27, 2000 (TW) ............... 89125104 A

(51) Int. Cl.
*G02F 1/1337* (2006.01)
(52) U.S. Cl. .............. 349/130; 349/123; 349/126; 349/128; 349/129; 349/132
(58) Field of Classification Search .............. 349/158, 349/155–157, 123–124, 126–129, 130, 132
See application file for complete search history.

(56) References Cited

U.S. PATENT DOCUMENTS

| | | | | |
|---|---|---|---|---|
| 5,926,246 A * | 7/1999 | Tomita et al. | ............... | 349/192 |
| 5,995,190 A * | 11/1999 | Nagae et al. | ............... | 349/156 |
| 6,573,964 B1 * | 6/2003 | Takizawa et al. | ........... | 349/129 |
| 6,614,497 B2 * | 9/2003 | Yamada | ..................... | 349/129 |
| 6,690,441 B2 * | 2/2004 | Moriya | ..................... | 349/130 |
| 7,110,078 B2 * | 9/2006 | Song et al. | ................ | 349/143 |
| 7,139,061 B2 * | 11/2006 | Ikeda et al. | ................ | 349/156 |

FOREIGN PATENT DOCUMENTS

| | | |
|---|---|---|
| JP | 11-258605 | 9/1999 |
| JP | 11-352489 | 12/1999 |

OTHER PUBLICATIONS

"Late-News Paper: A New Design to Improve Performance and Simplify the Manufacturing Process of High-Quality MVA TFT-LCD Panels" Y.Tanaka, Y. Taniguchi, T Sasaki, A. Takeda, Y. Koibe, K. Okamoto / Fujitsu Ltd., Tottori, Japan, 1999.

* cited by examiner

*Primary Examiner*—Andrew Schechter
*Assistant Examiner*—Hoan Nguyen
(74) *Attorney, Agent, or Firm*—J.C. Patents

(57) ABSTRACT

A pixel structure for a liquid crystal display has a first substrate with respect to a pixel region. A W-like extruding structure composed of two V-like is formed on a surface of the substrate. A second substrate with several openings is also provided in parallel to the first substrate. The openings of the second substrate are aligned along a direction from a tip of the V-like to an edge of the pixel. Moreover, a liquid crystal layer is located between the first substrate and a second substrate, wherein the extruding structure abuts the liquid crystal layer.

12 Claims, 3 Drawing Sheets

PIXEL STRUCTURE IN LIQUID CRYSTAL DISPLAY

BACKGROUND OF THE INVENTION

1. Field of Invention

The present invention relates to liquid crystal display (LCD). More particularly, the present invention relates to a pixel structure with multi-domain vertical alignment (MVA) design suitable uses in LCD.

2. Description of Related Art

Displaying device is very common in the daily life. Especially, a displaying device cannot be absent in a television set or a computer system, where the displaying device is used to display image to the user. In general, if the displaying device is designed by the cathode-ray tube (CRT) manner, it occupies a large space, causing inconvenient use. For example, a notebook cannot be equipped with a CRT display. In these considerations, a panel displaying device with matrix of pixels is successfully developed. The panel displaying device includes, for example, a liquid crystal display (LCD), or a thin film transistor (TFT) liquid crystal display (TFT-LCD).

The working principle of a twisted nematic (TN) LCD is schematically shown in FIG. 3. A liquid crystal layer 108 is confined between a glass plate 106. A polarizing layer 104 is arranged on the outer side of the glass plate 106 at the both sides, but the polarization direction is vertical to each other. For the left situation in FIG. 3, the incident light is polarized into one direction after the light passes the polarizing plate 104. The polarized incident light then enters the liquid crystal layer 108. When the liquid crystal layer 108 is not applied with a bias, the liquid crystal molecules are twisted by 90 degrees from one side to the other side. Since the polarizing plates 104 for the two sides have vertical polarization direction, the incident light can pass the lower polarizing plate 104.

If the liquid crystal layer 108 is applied with bias, such as the right situation in FIG. 3, the liquid crystal molecules are changed to a line structure. In this manner, the polarization direction of the incident light does not change. Since the lower polarizing plate 104 has the 90 degree rotated to the upper polarizing plate 104, the incident light can not pass the lower polarizing plate when the liquid crystal material is applied with bias.

Typically, the liquid crystal layer with respect to the substrate is divided into many pixels as a unit for displaying image. The shape of the pixel usually is a quadrate. In order to have better quality of vision angle for the LCD, the pixel is further divided into multiple regions, that is, a multi-domain vertical alignment (MVA) design.

FIGS. 1A and 1B are drawings, schematically illustrating a conventional pixel structure with the MVA design, where FIG. 1A is a top view and FIG. 1B is a cross-sectional view along the line I-I in FIG. 1A. The LCD includes a lot of pixels to display an image, here the drawing only shows one pixel structure for descriptions. In FIGS. 1A and 1B, the pixel structure of LCD includes an upper substrate 52, a lower substrate 56, and a liquid crystal layer 54 between the substrates. The liquid crystal molecule shape is elliptic. The pixel typically is a baguette.

In order to have multiple domains in one pixel, a surface of the upper substrate 52 adjacent to the liquid crystal layer 54 has several extruding lines 58 aligned in parallel. The lower substrate 56 has slits 60 in a discontinuation manner. The slits 60 are also arranged into a line parallel to the extruding lines 58 but between them.

In FIG. 1B, mechanism of the MVA design is further shown. When the liquid crystals are properly applied with the bias, the liquid crystals orients and become vertical to the surface for the substrate 52. However, due to the extruding line 58 and the slit 60, the oriented directions of the liquid crystals are not uniform, so that a multiple domains are obtained. The mechanism of MVA should be understood by the skilled artisans, no further description is made here.

Even though the MVA design principle has been proposed, technologies for how to effectively achieve the multiple domains with clear separation is still under developing. The extruding 58 associating with the slits 60 can divide the pixel into several domains but the domain boundaries are still not well defined.

SUMMARY OF THE INVENTION

The invention provides a pixel structure for a liquid crystal display. The pixel structure includes a W-like extruding structure, associating with openings, so as to improve the domain boundary.

As embodied and broadly described herein, the invention provides a pixel structure for a liquid crystal display which includes a first substrate with respect to a pixel region. A W-like extruding structure composed of two V-like is formed on a surface of the substrate. A second substrate with several openings is also provided in parallel to the first substrate. The openings of the second substrate are aligned along a direction from a tip of the V-like to an edge of the pixel. Moreover, a liquid crystal layer is located between the first substrate and a second substrate, wherein the extruding structure abuts the liquid crystal layer.

In the invention, an electric filed can be effectively generated between the W-like extruding structure and the openings, so as to clearly separate the pixel into multiple domains. Also and, due to the size of the opening is small, it consumes less area.

In the foregoing pixel structure of LCD, the openings include a triangle shape, of which two sides are parallel to slant sides of the V-like extruding structure.

In the foregoing pixel structure of LCD, the openings are aligned along a central line of the V-like extruding structure.

In the foregoing pixel structure of LCD, the pixel is a baguette, and the direction of the aligned openings is vertical to an edge of the pixel.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The invention particularly uses a W-like extruding structure and openings, so as to generate an electric field for clearly forming domains. Due to the small size of openings, it also consumes less area. An embodiment is provided in the following for descriptions.

Figure 1A:
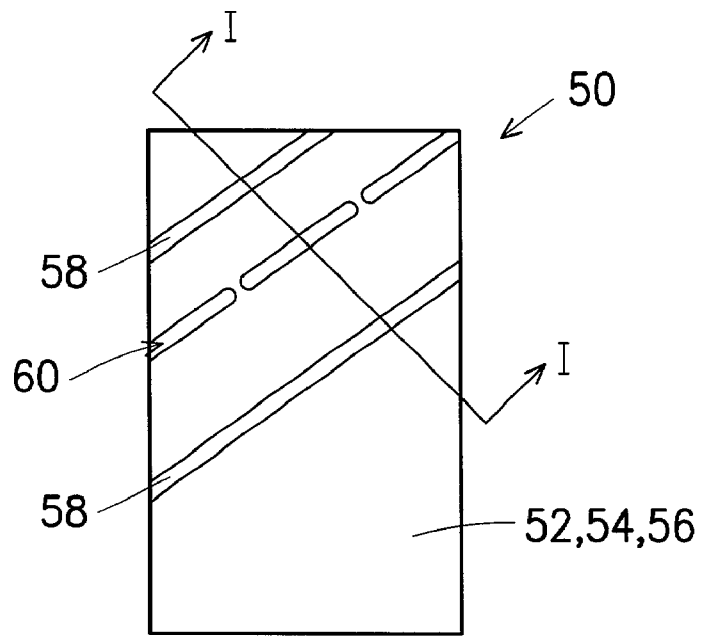
FIG. 1A is a top view, schematically illustrating a conventional pixel structure.
Figure 1B:
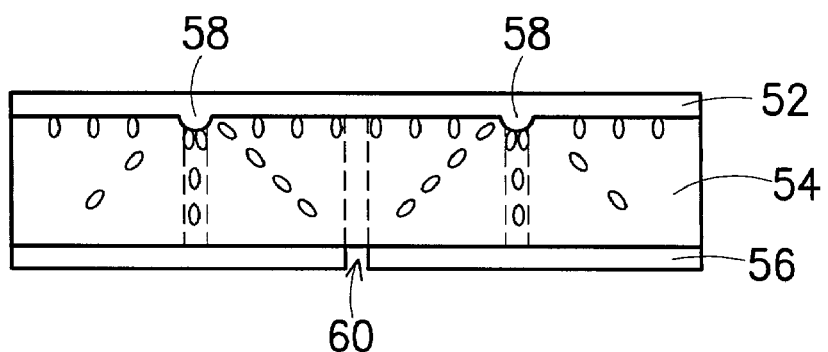
FIG. 1B is a cross-sectional view, schematically illustrating a conventional pixel structure along the line I-I in FIG. 1A.
Figure 2:
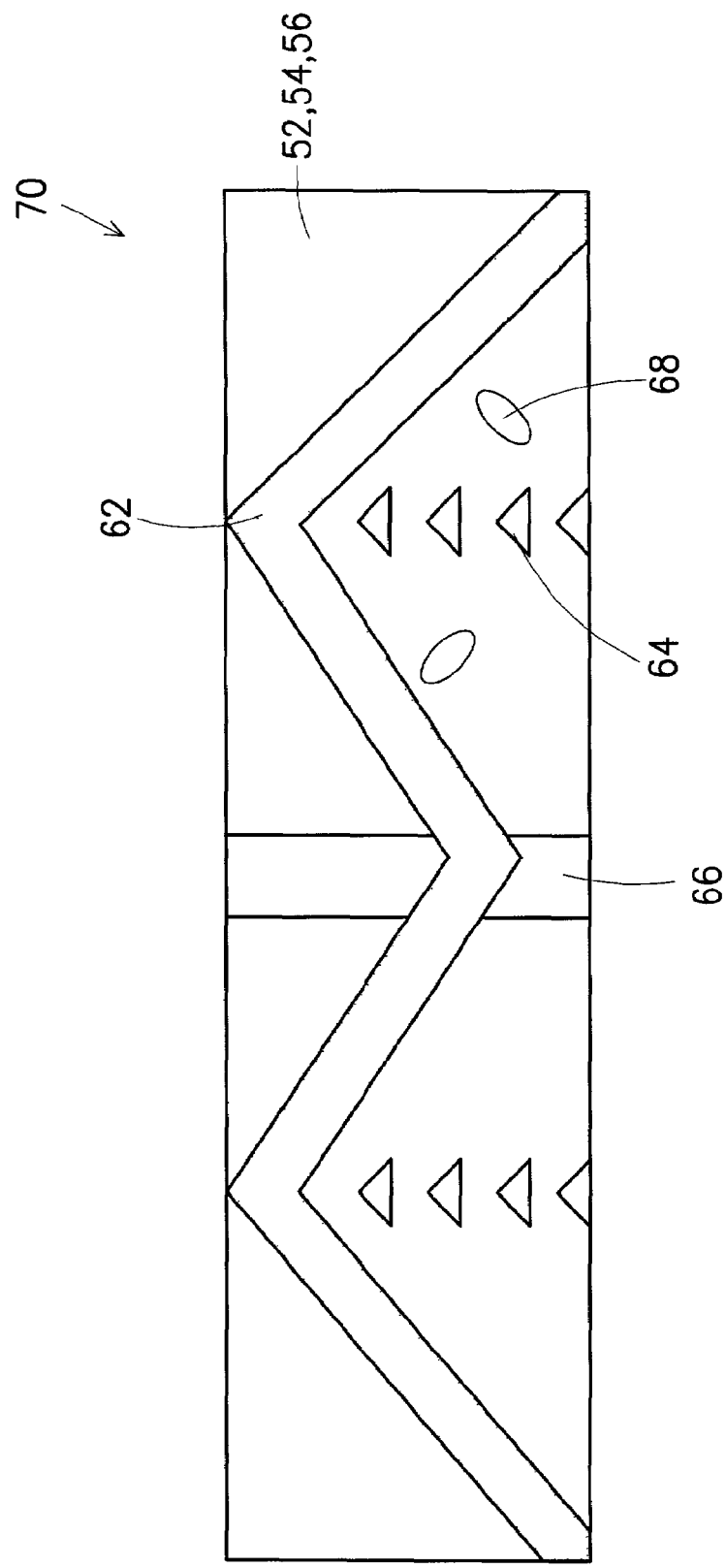
FIG. 2 is a top view, schematically illustrating a pixel structure, according to one preferred embodiment of this invention.
Figure 3:
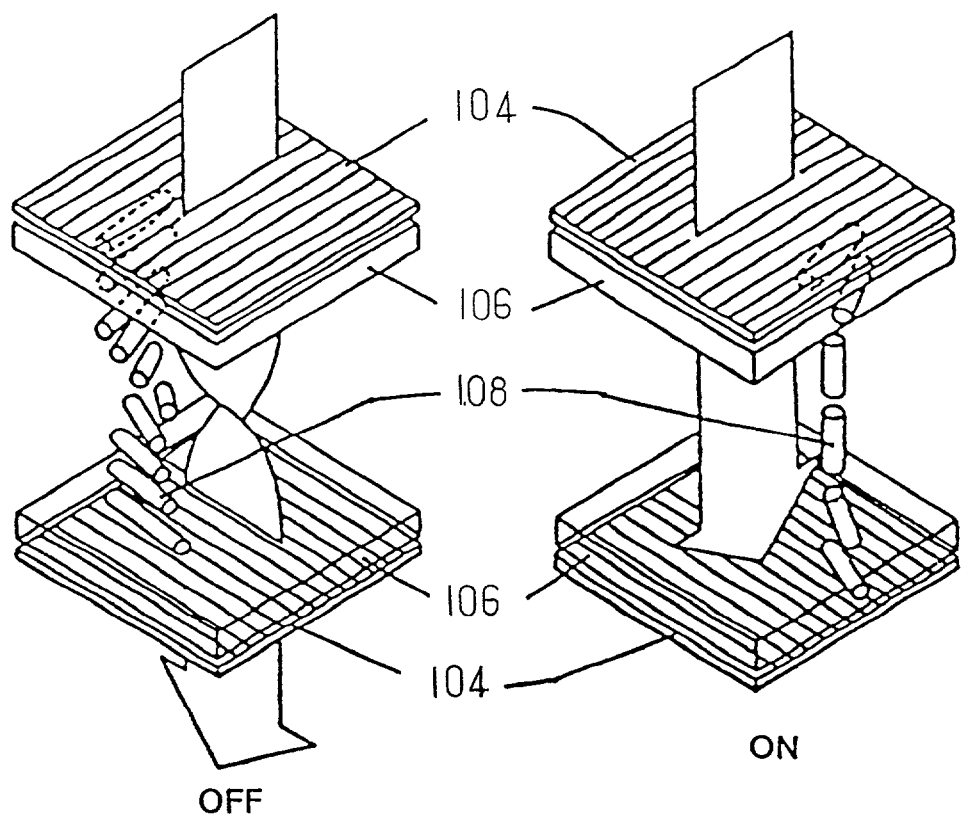
FIG. 3 is a drawing, schematically illustrating the mechanism of LCD for displaying.

FIG. 2 is a top view, schematically illustrating a pixel structure, according to one preferred embodiment of this invention. A LCD always includes a lot of pixels for displaying a image. Each of the pixels can be the same or different. A pixel 70 is used as a unit for descriptions in this embodiment. Like the pixel structure in FIG. 1B, the pixel structure 70 includes an upper substrate 52, a lower substrate 56, and a liquid crystal layer 54 between the two substrates. The liquid crystal molecule is elliptic. The pixel structure usually includes, for example, a baguette. One of features of the invention is proposing a W-like extruding structure 62 which is, for example, formed on one surface of the upper substrate 52, adjacent to the liquid crystal layer 54. In addition, the lower substrate 56 also includes several opening 64.

The W-like extruding structure 62 can be composed by two V-like structure. The liquid crystal tilted direction and the domain size can be controlled by adjusting the width and the angle of the sides of the V-like structure, so that the various image displaying requirements can be achieved. The intercepting angle of the two sides of the V-like structure preferably is 90 degrees. And, the shape of the pixel usually is a quadrate, and preferably is baguette. In general, there is no limitation for the shape and size of the opening 64. The opening would gives the effects of width of disclination line, transmission rate, liquid crystal response time, and so on. Therefore, the shape of opening can be adjusted according to the actual design. The shape of the opening can include, for example, a triangle, quadrate, or polygon, and preferably is an isosceles triangle. If the shape of the openings 64 is a triangle shape, the sides preferably are parallel to sides of the V-like structure. Preferable, the tip angle of the V-like structure is 90 degrees. The opening 64 are aligned from the tip angles of the W-like extruding structure to an edge of the pixel. For the preferred structure, the bending angle of the W-like extruding structure 62 is 90 degrees, and the slant side and an angle of 45 degrees from the sedge of the pixel structure the central bending portion can be covered by circuit elements, such as the capacitance Cst line 66.

When the pixel structure 70 is applied with proper bias, the region between the sides of the W-like structure 62 and the openings 64 form a domain. The openings 64 of invention can replace the convention slit 60 shown in FIG. 1A. The mechanism for generating the electric field using the openings 64 associating with the W-like extruding structure 62 can replace the slit 60 and further improve the boundary of the domain, the boundary width can thereby effectively reduced.

According to the foregoing MVA design of the invention, experiment data have shown that the invention can significantly reduce the phenomenon of color shift. Table 1 is the data of the transmission rate for comparing with the conventional MVA design in FIG. 1A. Table 2 shows the data of response time about these two designs.

TABLE 1

| | transmission rate | |
|---|---|---|
| | Conventional | Invention |
| Condition 1 | 12.504% | 12.452% |
| Condition 2 | 13.274% | 12.287% |
| Condition 3 | 13.063% | 12.498% |
| Condition 4 | 13.006% | 12.367% |
| Averaged | 12.96% | 12.40% |

TABLE 2

| | Response Time in ms | | | | | |
|---|---|---|---|---|---|---|
| | Convention | | | Invention | | |
| Condition | Tr | Tf | Total (ms) | Tr | Tf | Total (ms) |
| 1 | 10.3 | 14.1 | 24.4 | 12.5 | 14.0 | 26.5 |
| 2 | 11.1 | 14.4 | 25.5 | 12.1 | 13.8 | 25.9 |
| 3 | 11.2 | 13.9 | 24.1 | 13.8 | 13.9 | 27.7 |
| 4 | 11.1 | 14.4 | 25.5 | 14.6 | 13.6 | 28.2 |
| Averaged | 10.9 | 14.2 | 25.1 | 13.2 | 13.8 | 27.0 |

Tr: rising time, Tf: falling time.

In Tables 1 and 2, the invention maintain the same level of transmission rate and the response time without affections. However, the performance of reducing color shift is significantly improved. As shown in Table 3, various thickness of the liquid crystal layer in a unit of $\Delta$nd (nm) has been tested by comparing the color shift between the normal vision angle and a slant vision angle by 45 degrees, under the bright state.

TABLE 3

| | Color Shift | | | | | |
|---|---|---|---|---|---|---|
| | Convention | | | Invention | | |
| $\Delta$ nd (nm) | 373 | 360 | 347 | 373 | 360 | 347 |
| $\Delta$x | 0.0298 | 0.0265 | 0.0251 | 0.0171 | 0.0184 | 0.0136 |
| $\Delta$y | 0.0296 | 0.0268 | 0.0268 | 0.0169 | 0.0202 | 0.0143 | where, x and y are color coordinates made by Commission Internationale De L'eclairage (CIE). The quantity of $\Delta$x and $\Delta$y are the shift between the normal vision angle and a slant vision angle by 45 degrees. The smaller the quantities indicates the smaller the color shift. This also means there is less color difference for viewing the image from the normal direction or the tilted direction by 45 degrees. The data also shows a tendency that if the quantity of $\Delta$nd is smaller, the color shift is accordingly reduced.

The MVA design of the invention can effectively reduce the phenomenon of color shift. That is because the W-like extruding structure and the aligned direction of the openings are not parallel. This allows the liquid crystal to be more easily twisted. This can reduce the color shift.

From the experimental data shown in Tables 1-3, the pixel structure of the invention not only maintains the transmission rate and response time as performed by the conventional MVA design, but also greatly reduce the color shift, so as to improve the image quality of the LCD.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A pixel structure for a liquid crystal display, the pixel structure comprising:
   a first substrate, with respect to a pixel, having a W-like extruding structure composed of two V-like structures formed on a surface of the first substrate, which is with respect to a top view of the first substrate, wherein the pixel serves as a pixel unit including the two V-like structures to form one unit of the W-like extruding structure;
   an second substrate, parallel to the first substrate, having a plurality of openings, wherein, with respect to the top view, the openings are aligned along a direction from a tip of the V-like structures to an edge of the pixel structure; and
   a liquid crystal layer located between the first substrate and the second substrate, wherein the W-like extruding structure abuts the liquid crystal layer,
   wherein the first substrate and the second substrate produce a multi-domain vertical alignment (MVA) structure in the liquid crystal layer.

2. The pixel structure of claim 1, wherein a shape of the openings comprises an isosceles triangle, and sides of the isosceles triangle are parallel to sides of the V-like structure.

3. The pixel structure of claim 1, wherein the aligned direction of the openings is parallel to the central line of the V-like structure.

4. The pixel structure of claim 1, wherein the pixel structure has a shape of quadrate.

5. The pixel structure of claim 4, wherein the shape of pixel structure comprises a baguette.

6. The pixel structure of claim 1, wherein the V-like structure has a tip angle of 90 degrees.

7. The pixel structure of claim 1, wherein the openings are aligned in two line groups.

8. The pixel structure of claim 1, wherein the openings divide each of the V-like structures into two portions.

9. A baguette pixel structure, comprising:
   a first substrate having a W-like extruding structure composed of two V-like structures formed on a surface of the first substrate, which is with respect to a top view of the first substrate, wherein the pixel structure serves as a pixel unit, including the two V-like structures to form one unit of the W-like extruding structure;
   an second substrate, parallel to the first substrate, having a plurality of openings, wherein, with respect to the top view, the openings are aligned along a direction from a tip of the V-like structures and vertical to a long edge of the baguette pixel structure; and
   a liquid crystal layer located between the first substrate and the second substrate, wherein the W-like extruding structure abuts the liquid crystal layer,
   wherein the first substrate and the second substrate produce a multi-domain vertical alignment (MVA) structure in the liquid crystal layer.

10. The baguette pixel structure of claim 9, wherein a shape of the opening comprises a triangle, wherein an angle of the triangle is pointing to a tip of the V-like structures.

11. The baguette pixel structure of claim 9, wherein the openings are aligned in two line groups.

12. The baguette pixel structure of claim 9, wherein the openings divide each of the V-like structures into two portions.

* * * * *

UNITED STATES PATENT AND TRADEMARK OFFICE
CERTIFICATE OF CORRECTION

| | |
|---|---|
| PATENT NO. | : 7,336,331 B2 |
| APPLICATION NO. | : 09/767390 |
| DATED | : February 26, 2008 |
| INVENTOR(S) | : Ivan Wu et al. |

It is certified that error appears in the above-identified patent and that said Letters Patent is hereby corrected as shown below:

On the Title page of the patent grant, please replace item (73) Assignee's name from "Unipac Optoelectronics Corp." to --Au Optronics Corporation--

Signed and Sealed this

Twenty-eighth Day of September, 2010

David J. Kappos
*Director of the United States Patent and Trademark Office*